(12) United States Patent
Mori et al.

(10) Patent No.: US 7,977,407 B1
(45) Date of Patent: Jul. 12, 2011

(54) ANTIFOULING COATING COMPOSITION, ANTIFOULING COATING FILM FORMED FROM THE COMPOSITION, COATED OBJECT HAVING THE COATING FILM ON SURFACE, AND METHOD OF ANTIFOULING BY FORMING THE COATING FILM

(75) Inventors: Kiyomi Mori, Osaka (JP); Hidenori Waku, Osaka (JP); Nobuyuki Hamaura, Osaka (JP); Takayoshi Fujimoto, Osaka (JP); Satoshi Minamino, Osaka (JP)

(73) Assignee: Nitto Kasei Co., Ltd., Osaka (JP)

( * ) Notice: Subject to any disclaimer, the term of this patent is extended or adjusted under 35 U.S.C. 154(b) by 0 days.

(21) Appl. No.: 13/061,750

(22) PCT Filed: Dec. 17, 2009

(86) PCT No.: PCT/JP2009/071057
§ 371 (c)(1),
(2), (4) Date: Mar. 2, 2011

(87) PCT Pub. No.: WO2010/071180
PCT Pub. Date: Jun. 24, 2010

(30) Foreign Application Priority Data

Dec. 19, 2008 (JP) .................. 2008-324751

(51) Int. Cl.
*C09D 5/14* (2006.01)
*C09D 5/16* (2006.01)
*C08K 5/098* (2006.01)

(52) U.S. Cl. ........ 523/122; 523/177; 524/272; 524/301; 524/588; 428/447; 428/689; 106/15.05; 106/18.36

(58) Field of Classification Search .................. 523/122, 523/177; 524/272, 301, 588; 428/447, 689; 106/15.05, 18.36
See application file for complete search history.

(56) References Cited

U.S. PATENT DOCUMENTS

| 2003/0139558 A1* | 7/2003 | Yamamori et al. ............... 528/25 |
| 2003/0207962 A1* | 11/2003 | Oya et al. ..................... 523/177 |
| 2010/0209381 A1* | 8/2010 | Tanaka ....................... 424/78.09 |

FOREIGN PATENT DOCUMENTS

| JP | 10-030071 A | 2/1998 |
| JP | 11-116857 A | 4/1999 |
| JP | 11-116858 A | 4/1999 |
| JP | 2000-248029 A | 9/2000 |
| JP | 2000-248228 A | 9/2000 |
| JP | 2000-265107 A | 9/2000 |
| JP | 2001-081147 A | 3/2001 |
| JP | 2002-053796 A | 2/2002 |
| JP | 2002-053797 A | 2/2002 |
| JP | 2002-097406 A | 4/2002 |
| JP | 2003-183593 A | 7/2003 |
| JP | 2003-261816 A | 9/2003 |
| JP | 2005-082725 A | 3/2005 |
| WO | 2008/105122 A1 | 9/2008 |

OTHER PUBLICATIONS

International Search Report for PCT/JP2009/071057; mailing date Feb. 2, 2010.

* cited by examiner

*Primary Examiner* — Kriellion Sanders
(74) *Attorney, Agent, or Firm* — Hsiu-Ming Saunders; Intellectual Property Connections, Inc.

(57) ABSTRACT

An object of the present invention is to provide a composition for forming an environment friendly antifouling coating film that can effectively exhibit an antifouling effect in seawater for a long period of time and furthermore exhibits a small temperature dependency of the coating film dissolving amount. The present invention provides an antifouling coating composition comprising: (A) a triorganosilyl ester-containing copolymer obtained by a mixture of (a) a triorganosilyl methacrylate monomer represented by a general formula (1) in which $R^1$, $R^2$, and $R^3$ are equal or different each other, and each represent an alkyl group having 3 to 6 carbons and branched on α-position or a phenyl group, and (b) a methoxyalkyl methacrylate monomer represented by a general formula (2) in which $R^4$ represents an alkylene group having 2 to 4 carbons, wherein a content ratio of the monomer (a) in the mixture is 45 to 65 weight %, and a total content of the monomer (a) and the monomer (b) in the mixture is 80 weight % or more, and a copper salt that is at least one member selected from the group consisting of rosin copper salts and copper salts of rosin derivatives.

8 Claims, No Drawings

ANTIFOULING COATING COMPOSITION, ANTIFOULING COATING FILM FORMED FROM THE COMPOSITION, COATED OBJECT HAVING THE COATING FILM ON SURFACE, AND METHOD OF ANTIFOULING BY FORMING THE COATING FILM

REFERENCE TO RELATED APPLICATION

This application is a national stage application (under 35 U.S.C. 371) of PCT/JP2009/071057, filed Dec. 17, 2009, which claims the priority to Japan application Serial No. 2008-324751, filed Dec. 19, 2008, which is herein incorporated by reference in its entirety.

TECHNICAL FIELD

The invention relates to an antifouling coating composition, an antifouling coating film formed using the composition, a coated object having the coating film on its surface, and a method of antifouling treatment by formation of the coating film.

BACKGROUND ART

Aquatic fouling organisms such as barnacles, Tubeworms, common mussels, *Bugula neritina*, sea squirts, green layer, sea lettuce, and slimes attach to ships (especially the ship bottoms), fishing tools such as fishing nets and fishing net accessories, and structures submerged in seawater such as power plant aqueducts, leading to dysfunction, impaired appearances, and other problems of the ships and so on.

Conventionally, the attachment of aquatic fouling organisms has been heretofore prevented by coating surfaces of ships, fishing tools, and submerged structures with antifouling coating materials that include organic tin-containing copolymers. For example, a coating film formed by application of an antifouling coating material that contains a polymer with tributyltin groups gradually dissolves the polymer component into seawater, causing constant replacement of coating film surfaces, which enables the prevention of the attachment of aquatic fouling organisms to the coating film. After dissolution, the coating film can be reapplied to exhibit continued antifouling effect. However, the use of these antifouling coating materials has now been abandoned due to problems with marine pollution.

Triorganosilyl ester-containing copolymers with triorganosilyl groups, which are less toxic and less environmentally harmful than organic tin groups, have recently been developed and used as hydrolyzable copolymers to replace organic tin-containing copolymers (Patent Documents 1 to 12). However, although a coating film that includes a triorganosilyl ester-containing copolymer initially dissolves in seawater at a constant rate, the dissolving rate of the coating film gradually increases, and becomes excessively high after a long period of time has elapsed, making the design of the coating material difficult. For this reason, an attempt has been made to adjust the dissolving rate of the coating film by using triorganosilyl ester-containing copolymers in combination with rosin (or rosin derivatives) (Patent Documents 1 to 3).

However, when rosin (or a rosin derivatives) is used, although a portion of the rosin reacts with a metal compound contained in the coating composition to form a metal salt during the manufacture of a coating material, the reactivity is insufficient, resulting in the rosin (or rosin derivatives) with free carboxylic acid remaining in the coating composition. The rosin (or rosin derivatives) has high hydrophilic properties, and hence tends to deteriorate the water resistance of the coating film. If the coating film has poor water resistance, it tends to develop defects such as blisters, cracks, and the like.

Accordingly, a method has been suggested to remove the rosin with unreacted free carboxylic acid by pre-mixing an excess of a metal compound with rosin (Patent Document 11). In this method, however, even though an excess of a metal compound is used, the metal compound and rosin do not react sufficiently, making it difficult to completely remove the rosin (or rosin derivatives) having free carboxylic acid.

On the other hand, when a copolymer obtained by the copolymerization of silyl monomers having straight-chain alkyl groups, e.g., tri-n-butylsilyl methacrylate, is used as the above-mentioned triorganosilyl copolymer, the hydrolysis rate of the coating film is very high (i.e., has poor water resistance), making it difficult to control the dissolving rate of the coating film. For this reason, copolymers obtained by the copolymerization of silyl monomers wherein all of the alkyl groups are branched, e.g., triisopropylsilyl methacrylate, are now widely used (Patent Documents 4 to 12). When these copolymers are used, however, the coating films are brittle, and may be cracked, peeled, and the like.

When the above-mentioned copolymer containing triisopropylsilyl methacrylate or a metal (except copper) salt of rosin or rosin derivatives is used, the coating film exhibits stable solubility at a low seawater temperature, i.e., 25 deg. C. or less; however, as the seawater temperature becomes higher, the solubility of the coating film significantly increases, resulting in an unexpectedly large amount of the dissolved coating film. Therefore, it has been difficult to design the coating film thickness when applying an antifouling coating composition to ships that travel into tropical sea areas.

Patent Document 1: JP-A-Hei 10 (1998)-30071
Patent Document 2: JP-A-Hei 11 (1999)-116857
Patent Document 3: JP-A-Hei 11 (1999)-116858
Patent Document 4: JP-A-2000-248029
Patent Document 5: JP-A-2000-248228
Patent Document 6: JP-A-2000-265107
Patent Document 7: JP-A-2001-81147
Patent Document 8: JP-A-2002-53796
Patent Document 9: JP-A-2002-53797
Patent Document 10: JP-A-2002-97406
Patent Document 11: JP-A-2003-261816
Patent Document 12: JP-A-2005-082725

DISCLOSURE OF THE INVENTION

Problem to be Solved by the Invention

An object of the present invention is to provide a composition for forming an environment friendly antifouling coating film that can effectively exhibit an antifouling effect in seawater for a long period of time and furthermore exhibits a small temperature dependency of the coating film dissolving amount.

Means for Solving the Problem

The present inventors conducted extensive research to solve the above problem, and found that the above object can be achieved by using a composition having a specific component. The present invention has been accomplished based on this finding.

Specifically, the present invention provides the antifouling coating composition, the antifouling coating film formed by using the composition, the coated object having the coating film on its surface, and the method of antifouling treatment by formation of the coating film as described below.

1. An antifouling coating composition comprising:
(A) a triorganosilyl ester-containing copolymer obtained by a mixture of
(a) a triorganosilyl methacrylate monomer represented by a general formula (1):

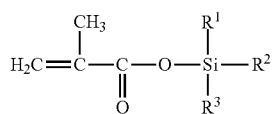

in which,
$R^1$, $R^2$, and $R^3$ are equal or different each other, and each represent an alkyl group having 3 to 6 carbons and branched on α-position or a phenyl group, and
(b) a methoxyalkyl methacrylate monomer represented by a general formula (2):

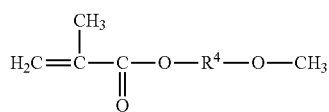

in which,
$R^4$ represents an alkylene group having 2 to 4 carbons, wherein a content ratio of the monomer (a) in the mixture is 45 to 65 weight %, and a total content of the monomer (a) and the monomer (b) in the mixture is 80 weight % or more, and
(B) a copper salt that is at least one member selected from the group consisting of rosin copper salts and copper salts of rosin derivatives.

2. The antifouling coating composition of the above item 1, wherein the antifouling coating composition forms an antifouling coating film which has a coating film dissolving amount in seawater of 25 deg. C. which is 2 μm or more per month, and has a temperature dependency coefficient of a coating film dissolving amount (a coating film dissolving amount in seawater of 35 deg. C./a coating film dissolving amount in seawater of 25 deg. C.), the coefficient being 1.3 or less.

3. The antifouling coating composition of the above item 1 or 2, wherein the triorganosilyl ester-containing copolymer (A) has a weight-average molecular weight of 20,000 to 70,000.

4. The antifouling coating composition recited in any one of the items 1 to 3, wherein a weight ratio defined by the triorganosilyl ester-containing copolymer (A)/the copper salt (B) is 80/20 to 20/80.

5. The antifouling coating composition recited in any one of the items 1 to 4, wherein a weight ratio defined by the triorganosilyl ester-containing copolymer (A)/the copper salt (B) is 60/40 to 40/60.

6. A method of antifouling treatment comprising the step of forming an antifouling coating film on the surface of an object to be coated using the antifouling coating composition recited in any one of the items 1 to 5.

7. An antifouling coating film formed using the antifouling coating composition recited in any one of the items 1 to 5.

8. A coated object having the antifouling coating film of the item 7 on the surface thereof.

Effect of the Invention

An antifouling coating composition of the invention can form an antifouling coating film which can inhibit or prevent attachment of aquatic fouling organisms by effectively exhibiting the antifouling effect.

The antifouling coating composition of the present invention can desirably control the hydrolysis rate of the coating film even when the temperature of seawater is high. Therefore, the coating film formed by using the composition can maintain a stable antifouling effect for a long time, even when a ship is sailing in an area of high seawater temperature. In particular, the antifouling coating film formed of the antifouling coating composition of the invention exhibits a substantially identical coating film dissolving amount in high seawater temperature (about 35 deg. C.) and in normal seawater temperature (about 25 deg. C.). In other words, the antifouling coating film has small temperature dependency. Therefore, the composition of the present invention eases the design of the coating film.

Furthermore, the composition of the invention has excellent long-term storability. In other words, the composition of the invention hardly thickens, or gelates or solidifies even after a long period of storage. Furthermore, the antifouling coating composition of the invention is environment-friendly, and thus substantially free from marine pollution even if dissolved in seawater.

The antifouling coating film formed of the antifouling coating composition of the invention is advantageous in that: 1) It has excellent water resistance, and therefore cracking, peeling or the like is unlikely to occur even if it is in contact with seawater for a long time; 2) It has a suitable hardness, and therefore cold flow or other defects is unlikely to occur in the resulting coating film; 3) It has a high adhesiveness to the object on which a coating film is formed; and 4) because it exhibits a stable coating film dissolving amount even in high-temperature seawater, it can effectively exhibit an antifouling effect in seawater for a long period of time in sailing a sea area having high seawater temperature The coated object of the invention can be preferably used as the above-mentioned ship (in particular ship bottom), fishing tool, structures submerged in seawater, etc. For example, the above-mentioned antifouling coating film is formed on the surface of a ship bottom, the antifouling coating film gradually dissolves from the surface thereof so that the coating film surface is always renewed, enabling prevention of the attachment of aquatic fouling organisms to the coating film.

Furthermore, the antifouling coating film has a suitable solubility. Therefore, the ship can maintain the antifouling effect for a long time. In particular, even when the ship sails in a sea area having high water temperature, it can exhibit a long-term, antifouling effect, because the coating film dissolving rate is stable. In addition, even when the ships are not moving, for example, during anchorage, rigging, etc., it can exhibit a long-term, antifouling effect with little attachment or accumulation of aquatic fouling organisms. This reduces the frictional resistance of the ships, and thus reduces the fuel cost while sailing.

Furthermore, the antifouling coating film on the surface is basically free from coating film defects even after a long period of time. For this reason, after using the coated object for a predetermined period, a new antifouling coating film can be desirably formed by directly recoating the antifouling coating film composition thereon. This makes it possible to continuously maintain the antifouling effect in a simple and inexpensive manner.

EMBODIMENT FOR CARRYING OUT THE INVENTION

<Antifouling Coating Composition>

An antifouling coating composition comprises:

(A) a triorganosilyl ester-containing copolymer obtained by a mixture of (a) a triorganosilyl methacrylate monomer represented by a general formula (1):

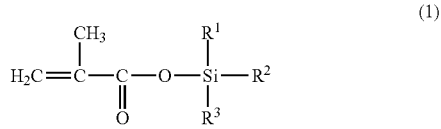

in which, $R^1$, $R^2$, and $R^3$ are equal or different each other, and each represent an alkyl group having 3 to 6 carbons and branched on α-position or a phenyl group, and (b) a methoxyalkyl methacrylate monomer represented by a general formula (2):

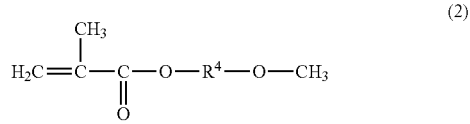

in which, $R^4$ represents an alkylene group having 2 to 4 carbons, wherein a content ratio of the monomer (a) in the mixture is 45 to 65 weight %, and a total content of the monomer (a) and the monomer (b) in the mixture is 80 weight % or more, and (B) a copper salt that is at least one member selected from the group consisting of rosin copper salts and copper salts of rosin derivatives.

The antifouling coating composition of the invention can form an antifouling coating film which can inhibit or prevent attachment of aquatic fouling organisms (can effectively exhibit antifouling effect).

In particular, the antifouling coating composition of the invention can form an antifouling coating film with small temperature dependency by containing the copolymer (A) and the copper salt (B) as essential component. The antifouling coating film formed of the antifouling coating composition of the invention exhibits a substantially identical coating film dissolving amount in high seawater temperature (about 35 deg. C.) and in normal seawater temperature (about 25 deg. C.).

Specifically, the antifouling coating composition of the invention can form an antifouling coating film which has a coating film dissolving amount in seawater of 25 deg. C. which is 2 μm or more, preferably about 2 to 10 μm, more preferably about 3 to 5 μm per month. When the coating film dissolving amount is 2 μm or more per month, the coating film can appropriately exhibit a long-term antifouling effect in seawater, for example, for 2 or more years. The coating film dissolving amount (μm) per month is determined by the method of Test Example 6.

Furthermore, the antifouling coating composition of the invention can form an antifouling coating film which has a temperature dependency coefficient of a coating film dissolving amount (a coating film dissolving amount in seawater of 35 deg. C./a coating film dissolving amount in seawater of 25 deg. C.), the coefficient being 1.3 or less. When the temperature dependency coefficient is about 1.3 or less, the coating film thickness to be formed of a ship which sails in sea area having a high seawater temperature can be easily designed. The temperature dependency coefficient is determined by the method of Test Example 7.

Furthermore, the antifouling coating film formed of the antifouling coating composition of the invention is unlikely to cause coating film defects such as blister, crack, etc. in high temperature seawater.

Thus, the antifouling coating composition of the invention can form an antifouling coating film which has small temperature dependency and is unlikely to cause coating film defects in high temperature seawater, and thus can be properly used as, for example, ship bottom coating material.

According to a conventional hydrolyzable antifouling coating material, although the coating film dissolves stably at normal seawater temperature (about 25 deg. C.), the coating film dissolving amount at about 35 deg. C. was much larger than that at about 25 deg. C., and thus coating film thickness design of a ship bottom of a ship which sails in a sea area having a high seawater temperature was difficult. In addition, there was a problem that a coating film formed of a conventional hydrolyzable antifouling coating material tends to cause coating film defects such as blister, crack, etc.

In addition, the antifouling coating composition of the inventions are excellent in storage stability, and will therefore hardly gelate or solidify even after a long period of storage.

<<Triorganosilyl Ester-Containing Copolymer (A)>>

An antifouling coating composition comprises: a triorganosilyl ester-containing copolymer (A) obtained by a mixture of (a) a triorganosilyl methacrylate monomer represented by a general formula (1):

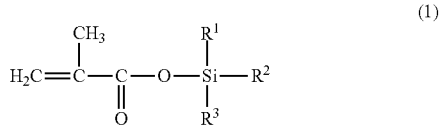

in which, $R^1$, $R^2$, and $R^3$ are equal or different each other, and each represent an alkyl group having 3 to 6 carbons and branched on α-position or a phenyl group, and (b) a methoxyalkyl methacrylate monomer represented by a general formula (2):

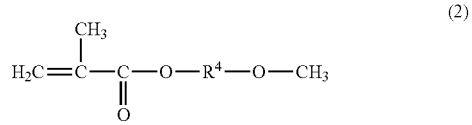

in which, $R^4$ represents an alkylene group having 2 to 4 carbons.

The glass-transition temperature (Tg) of the copolymer (A) is preferably about 30 to 80 deg. C. and is more preferably about 40 to 70 deg. C. When Tg is about 30 to 80 deg. C., coating film hardness is hardly dependent on water temperature or air temperature, and thus suitable hardness and strength can be maintained for a long time. Therefore, coating film defects such as cold flow, crack, peel-off, etc. are unlikely to occur.

The copolymer (A) has a weight-average molecular weight (Mw) of about 20,000 to 70,000, and preferably about 30,000 to 60,000. When Mw is about 20,000 to 70,000, physical properties (coating film hardness and strength) is preferable (crack or peel-off is unlikely to occur), a long-term, antifouling effect is properly exhibited.

One example of the method for the measurement of the Mw is gel permeation chromatography (GPC). When the Mw is measured by GPC, it is expressed as a value (a polystyrene-reduced value), obtained by conducting the measurement after preparing a calibration curve using polystyrene as a reference material.

The copolymer (A) is obtained by copolymerizing the monomer (a), the monomer (b) (, and the monomer (c) below). The copolymerization ratio of these monomers are usually proportional to the content ratio of the monomers in the mixture explained in the section "Synthesis of Triorganosilyl Ester-containing Copolymer (A)" below.

The copolymer (A) may be any copolymer of random copolymer, alternate copolymer, periodical copolymer, or block copolymer.

Hereinafter, methods of synthesizing the monomer (a), the monomer (b), the copolymer (A) are specifically explained.

Triorganosilyl Methacrylate Monomer (a)

Examples of the alkyl group having 3 to 6 carbons and branched on α-position include isopropyl, s-butyl, t-butyl, 1-ethylpropyl, 1-methylbutyl, 1-methylpentyl, 1,1-dimethylpropyl, 1,1-dimethylbutyl, thexyl, etc.

In particular, the invention enables formation of an antifouling coating film which is unlikely to cause coating film defects and excellent in water resistance by selecting specific groups for $R^1$, $R^2$, and $R^3$. From such an aspect, $R^1$, $R^2$, and $R^3$ are equal or different each other, and are each preferably isopropyl, s-butyl, t-butyl, and phenyl, and more preferably isopropyl, t-butyl, and phenyl.

Examples of the monomer (a) include triisopropylsilyl methacrylate, tri-s-butylsilyl methacrylate, triphenylsilyl methacrylate, diisopropyl-s-butylsilyl methacrylate, diisopropyl-t-butylsilyl methacrylate, diisopropylthexylsilyl methacrylate, diisopropylphenylsilyl methacrylate, isopropyl-di-s-butylsilyl methacrylate, isopropyl-diphenylsilyl methacrylate, diphenylthexlysilyl methacrylate, t-butyldiphenylsilyl methacrylate, etc. In particular, from a viewpoint of forming an antifouling coating film which is unlikely to cause coating film defects and excellent in water resistance, triisopropylsilyl methacrylate, tri-s-butylsilyl methacrylate, and t-butyldiphenylsilyl methacrylate are preferred, and triisopropylsilyl methacrylate, and t-butyldiphenylsilyl methacrylate are more preferred. These triorganosilyl methacrylate monomers are used singly or in combination.

Methoxyalkyl Methacrylate Monomer (b)

Examples of the alkylene having 2 to 4 carbons include ethylene, 1-methylethylene, propylene, butylene, etc. $R^4$ is preferably ethylene.

Examples of the monomer (b) include 2-methoxyethyl methacrylate, 2-methoxypropyl methacrylate, and 4-methoxybutyl methacrylate, etc. 2-methoxyethyl methacrylate is especially preferred. These methoxyalkyl methacrylate are used singly or in combination.

Another Monomer

The mixture may further contain another ethylenically unsaturated monomer (c) which is copolymerizable with the monomer (a) and the monomer (b).

Examples of the monomer (c) include methyl (meth)acrylate, ethyl (meth)acrylate, n-butyl (meth)acrylate, i-butyl (meth)acrylate, t-butyl (meth)acrylate, 2-ethylhexyl (meth) acrylate, lauryl (meth)acrylate, 2-methoxyethyl acrylate, 2-methoxypropyl acrylate, 4-methoxybutyl acrylate, 2-ethoxyethyl (meth)acrylate, ethylene glycol monomethyl (meth)acrylate, propylene glycol monomethyl (meth)acrylate, 2-hydroxyethyl (meth)acrylate, 2-hydroxypropyl (meth) acrylate, dimethylaminoethyl (meth)acrylate, diethylaminoethyl (meth)acrylate, benzyl (meth)acrylate, and phenyl (meth)acrylate and like (meth)acrylic ester; vinyl chloride, vinylidene chloride, (meth)acrylonitrile, vinyl acetate, butyl vinyl ether, lauryl vinyl ether, n-vinyl pyrrolidone and like vinyl compounds; styrene, vinyl toluene, a-methyl styrene and like aromatic compounds, etc. Among these, (meth) acrylic esters are preferred, and methyl (meth)acrylate, ethyl (meth)acrylate, n-butyl (meth)acrylate, i-butyl (meth)acrylate, 2-ethylhexyl (meth)acrylate, and 2-methoxyethyl acrylate are more preferred. Examples of the monomer (c) may be used singly or in combination as monomer component of the copolymer (A).

Synthesis of Triorganosilyl Ester-Containing Copolymer (A)

The copolymer (A) is obtained from the mixture of the monomer (a), the monomer (b) (, and the monomer (c)).

The content of the monomer (a) in the mixture is preferably about 45 to 65 weight %, and more preferably about 50 to 60 weight %. When the content of the monomer (a) is about 45 to 65 weight %, the coating film formed using the resultant antifouling coating composition can exhibit stable solubility, and it can maintain an antifouling effect for a long period of time.

The content of the monomer (b) in the mixture is preferably about 30 to 50 weight %, and more preferably about 30 to 40 weight % When the content of the monomer (b) is about 30 to 50 weight %, the coating film formed using the resultant antifouling coating composition can exhibit stable solubility, and it can maintain an antifouling effect for a long period of time.

The total content of the monomer (a) and the monomer (b) in the mixture is preferably about 80 weight % or more, and more preferably about 80 to 90 weight %. When the total content is about 80 weight % or more, the coating film formed using the resultant antifouling coating composition has small temperature dependency and excellent physical properties.

The copolymer (A) is obtained by polymerizing the monomer (a), the monomer (b), if necessary the monomer (c) in the mixture. The polymerization is for example performed in the presence of a polymerization initiator.

Examples of the polymerization initiator include 2,2'-azobisisobutyronitrile (AIBN), 2,2'-azobis-2-methylbutyronitrile, dimethyl-2,2'-azobisisobutyrate and like azo compounds; benzoyl peroxide, di-tert-butyl peroxide, tert-butyl peroxybenzoate, tert-butyl peroxy isopropylcarbonate, t-butyl peroxy-2-ethyl hexanoate and like peroxide, etc. These polymerization initiators may be used singly or in combination. The polymerization initiator is especially preferred to be 2,2'-azobisisobutyronitrile, and t-butyl peroxy-2-ethyl hexanoate.

The molecular weight of the triorganosilyl ester-containing copolymer can be suitably adjusted by suitably selecting the amount of the polymerization initiator used.

Examples of polymerization methods include solution polymerization, bulk polymerization, emulsion polymerization, suspension polymerization, etc. Among these, solution polymerization is preferable, because it allows the copolymer (A) to be prepared easily and accurately.

In the polymerization reaction, an organic solvent may be added, if necessary. Examples of the organic solvent include xylene, toluene and like aromatic hydrocarbon-based solvents; hexane, heptane and like aliphatic hydrocarbon-based solvents; ethyl acetate, butyl acetate, isobutyl acetate, methoxypropyl acetate and like ester-based solvents; isopropyl alcohol, butyl alcohol and like alcohol-based solvents; dioxane, diethyl ether, dibutyl ether and like ether-based solvents; methyl ethyl ketone, methyl isobutyl ketone and like ketone-based solvents, etc. Among these, aromatic hydrocarbon-based solvents are preferable, and xylene is particularly preferable. These solvents may be used singly or in combination.

The reaction temperature in the polymerization reaction may be suitably selected depending on the type of the polymerization initiator, etc., but is usually about 70 to 140 deg. C., and preferably about 80 to 120 deg. C. The time necessary for the polymerization reaction may be suitably selected depending on the reaction temperature, etc., but is usually about 4 to 8 hours.

The polymerization reaction is preferably conducted in an inert gas (e.g. nitrogen gas and argon gas) atmosphere.

<<Copper Salt (B)>>

An antifouling coating composition of the invention contains at least one copper salt (B) selected from the group consisting of rosin copper salts and copper salts of rosin derivatives.

Because the copper salt (B) have high compatibility with the copolymer (A), it can stably exist in the coating film. Therefore, the composition of the present invention has excellent long-term storageability.

Furthermore, the copper salt has low hydrophilicity, and is unlikely to be involved in ion exchange with other metal ions in seawater. Therefore, an obtain antifouling coating film exhibits preferable water resistance and stable solubility for a long time, and hardly cause coating film defects even in a sea area having a high seawater temperature (about 35 deg. C.).

When sodium salt, calcium salt, magnesium salt, etc. of rosin (or rosin derivatives) is used in place of rosin copper salts and copper salts of rosin derivatives, the water resistance of the coating film deteriorates because of high hydrophilicity of these metal salts. Furthermore, zinc salts of rosin (or rosin derivatives) are also hydrophilic, though less hydrophilic than the above metals, and therefore enhance the solubility of the coating film. When zinc salts of rosin (or rosin derivatives) are singly used, the resultant antifouling coating material exhibits no problem in use in a sea area having a relatively low seawater temperature (25 deg. C. or less), but excessively increases solubility in a sea area having a high seawater temperature (about 35 deg. C.) and tends to cause crack, blister and like coating film defects.

Examples of the rosin copper salt include gum rosin copper salt, wood rosin copper salt, tall oil rosin copper salt, etc. Examples of the copper salt of the rosin derivative include hydrogenated rosin copper salt, disproportionated rosin copper salt, maleinized rosin copper salt, formylated rosin copper salt, polymerized rosin copper salt, etc. An antifouling coating composition of the invention may contain these copper salts (B) singly or in combination.

The copper salt (B) is preferred to be at least one copper salt selected from the group consisting of gum rosin copper salt, wood rosin copper salt, tall oil rosin copper salt, hydrogenated rosin copper salt, and disproportionated rosin copper salt.

The copper salt (B) may be commercially available one. The copper salt (B) may be produced by a known method. For example, the copper salt (B) can be prepared by reacting rosin (or a rosin derivatives) having a free carboxyl group (COO$^-$ group) with a copper hydroxide while heating them in a solution.

The antifouling coating composition of the invention may further includes other metal salts (e.g. zinc salts, etc.) of rosin (or rosin derivatives) than the copper salt (B) as long as they do not adversely affect the effect of the invention.

The weight ratio defined by the copolymer (A)/the copper salt (B) in the antifouling coating composition of the invention is preferably about 80/20 to 20/80, and more preferably about 60/40 to 40/60. When the weight ratio of the copolymer (A) and the copper salt (B) about 80/20 to 20/80, the resultant antifouling coating film is insusceptible to seawater temperature, and exhibits stable coating film dissolving rate even in seawater having a high temperature. In addition, the antifouling coating film has suitable coating film hardness, and excellent strength and water resistance.

It is preferred that the composition of the present invention is substantially free from rosin and rosin derivatives that contain free carboxyl groups. Specifically, the content of the rosin and rosin derivative in the composition of the present invention is preferably about 1 or less weight %, and more preferably about 0 to 0.1 weight %. The rosin and rosin derivatives that contain free carboxyl groups have high hydrophilicity. Therefore, when the coating film contains such rosins and rosin derivatives, the water resistance of the coating film will be lowered, which may cause blisters, cracking and like defects on the coating film.

<<Cuprous Oxide>>

It is preferred that the antifouling coating composition of the present invention contains cuprous oxide. By containing the cuprous oxide, the resulting coating film can effectively exhibit the antifouling effect. The cuprous oxide can function as an antifoulant. There is no limitation to the form of the cuprous oxide, as long as it does not adversely affect the effect of the invention. For example, the cuprous oxide may take a form of a particle.

The average particle diameter of the cuprous oxide is preferably about 3 to 30 μm. When the composition of the present invention contains the cuprous oxide having an average particle diameter of about 3 to 30 μm, the dissolving rate of the coating film can be desirably controlled so that a long-term antifouling effect can be exhibited.

A preferable example of the form of the cuprous oxide is a cuprous oxide whose surface is covered with a coating agent. For example, when a particulate cuprous oxide is used, it is preferable that the surface of each particle be covered with a coating agent. By covering with a coating agent, oxidation of the cuprous oxide can be desirably prevented.

Examples of the usable coating agents include stearic acid, lauric acid, glycerin, sucrose, lecithin, etc. These coating agents may be used singly or in combination.

It is preferable that the composition of the invention contains 100 to 450 parts by weight, and more preferably 200 to 400 parts by weight of cuprous oxide per total amount of 100 parts by weight of the copolymer (A) and the copper salt (B). When the content of the cuprous oxide is 100 to 400 parts by weight per the total amount of 100 parts by weight, the coating film can exhibit an excellent antifouling effect.

The composition of the present invention may contain any inorganic antifoulant, in addition to the cuprous oxide, in such an amount that does not adversely affect the antifouling effect. Examples of usable inorganic antifoulants include copper thiocyanate (general name: copper rhodanide), cupronickel, copper powder, etc. These inorganic antifoulants may be used singly or in combination.

<<Organic Antifoulants>>

It is preferable that the antifouling coating composition of the present invention further contains organic antifoulant. There is no limitation to the organic antifoulants as long as they have a killing or repelling effect against aquatic fouling organisms. Examples of the organic antifoulants include 2-mercaptopyridine-N-oxide copper (general name: copper pyrithione) and like organic copper compounds; 2-mercaptopyridine-N-oxide zinc (general name: zinc pyrithione), zinc ethylene bis(dithio carbamate) (general name: zineb), zinc bis(dimethyldithiocarbamate) (general name: ziram), dizinc bis(dimethyldithiocarbamate)ethylenebis(dithiocarbamate) (general name: polycarbamate) and like organic zinc compounds; pyridine-triphenylborane, 4-isopropyl pyridyl-diphenylmethyl borane, 4-phenyl pyridiyl-diphenyl borane, triphenylboron-n-octadecyl amine, triphenyl[3-(2-ethylhexyloxy)propyl amine]boron and like organic boron compounds; 2,4,6-trichloromaleimide, N-(2,6-diethylphenyl)-2,3-dichloromaleimide and like maleimide compounds; and, 4,5-dichloro-2-n-octyl-3-isothiazolone (general name: Sea-Nine 211), 3,4-dichlorophenyl-N—N-dimethylurea (general name: diuron), 2-methylthio-4-t-butylamino-6-cyclopropylamino-s-triazine (general name: Irgarol 1051), 2,4,5,6-tetrachloroisophthalonitrile (general name: chlorothalonil), N-dichlorofluoromethylthio-N',N'-dimethyl-N-p-tolylsulfamide (general name: tolylfluanid), N-dichloromethylthio-N',N'-dimethyl-N-phenylsulfamide (general name: dichlofluanid), 2-(4-thiazolyl)benzimidazole (general name: thiabendazole), 3-(benzo[b]thien-2-yl)-5,6-dihydro-1,4,2-oxathiazine-4-oxide (general name: bethoxazine), 2-(p-chlorophenyl)-3-cyano-4-bromo-5-trifluoromethylpyrrole (general name: Econea28), etc. Among these, copper pyrithione, zinc pyrithione, zineb, Sea-Nine 211, and Irgarol 1051 are preferred, and copper pyrithione, and Sea-Nine 211 are more preferred. These organic antifoulants enhance the antifouling effect in combination with the above-mentioned cuprous oxide, and therefore even a little amount of the organic antifoulants works to maintain the antifouling effect in a sea area having active fouling organisms. These organic antifoulants may be used singly or in combination.

The content of the organic antifoulants in the composition of the present invention is preferably 1 to 50 parts by weight, and more preferably 10 to 30 parts by weight per total amount of 100 parts by weight of the copolymer (A) and the copper salt (B). If the content of the organic antifoulants is less than one part by weight, the antifouling effect of the organic antifoulant cannot satisfactorily be exhibited. If the content exceeds 50 parts by weight, no improvement in the antifouling effect can be observed in proportion to the increase in the amount of the organic antifoulant; this is thus uneconomical.

<<Other Additives, Etc.>>

The antifouling coating composition of the present invention may further contain plasticizers, dewatering agents, dispersants, known pigments and like known additives.

By containing a plasticizer, the plasticity of the composition can be enhanced, allowing a desirably strong coating film to be obtained. Examples of the plasticizers include tricresyl phosphate, trioctylphosphate, triphenyl phosphate and like phosphate esters; dibutyl phthalate, dioctyl phthalate and like phthalate esters; dibutyl adipate, dioctyl adipate and like adipate esters; dibutyl sebacate, dioctyl sebacate and like sebacate esters; epoxidized soybean oil, epoxidized linseed oil and like epoxidized oils and fats; methyl vinyl ether polymer, ethyl vinyl ether polymer and like alkyl vinyl ether polymers; polyethylene glycol, polypropylene glycol and like polyalkylene glycols; and, t-nonylpentasulfide, Vaseline, polybutene, tris(2-ethyl hexyl) trimellitate, silicone oil, liquid paraffin, chlorinated paraffin, polymeric plasticizers formed of ethylenically unsaturated carboxylate polymer, etc. Among these, tricresyl phosphate, epoxidized soybean oil, and epoxidized linseed oil are preferred. Epoxidized soybean oil and epoxidized linseed oil are especially preferred. By use of these plasticizers, physical properties of the coating film is improved, and in addition water resistance is enhanced. Therefore, penetration of seawater into the coating film is prevented, and thus crack, blister and like coating film defects can be prevented even in a sea area having a high seawater temperature. These plasticizer may be used singly or in combination.

The content of the plasticizer in the composition of the present invention depends on the content of the copper salt (B), but is preferably 1 to 50 parts by weight, and more preferably 5 to 30 parts by weight per total amount of 100 parts by weight of the copolymer (A) and the copper salt (B). If the content of the plasticizer is less than one part by weight, satisfactory improvement in the physical properties (strength and adhesiveness) cannot be obtained; if it exceeds 50 parts by weight, the coating film becomes too soft, and is practically unusable.

It is preferable that the antifouling coating composition of the present invention further contains a dewatering agent. The dewatering agent is an agent that removes water in the composition. Examples of usable dewatering agents include dehumidifiers and dehydrating agents. The dehumidifiers and the dehydrating agents may all be used singly, or both the dehumidifiers and the dehydrating agents may be used in combination.

The dehumidifier is a compound that can remove water in the coating composition by reacting with water. Examples of the dehumidifiers include methyl orthoformate, ethyl orthoformate and like alkyl orthoformates; tetraethoxysilane, tetrabutoxysilane, tetraphenoxysilane, tetrakis(2-ethoxybutoxy)silane, methyltrimethoxysilane, methyltriethoxysilane, dimethyldiethoxysilane, trimethylethoxysilane, diphenyldiethoxysilane and like alkoxysilanes; maleic anhydride, phthalic anhydride and like acid anhydrides, etc.

The dehydrating agent is a compound that can remove water in the composition by incorporating the water into the dehydrating agent as crystallization water. Examples of dehydrating agents include anhydrous gypsum, molecular sieves, magnesium sulfate, sodium sulfate, etc.

There is no limitation to the content of the dewatering agent in the composition of the present invention, but it is preferably 1 to 50 parts by weight, and more preferably 2 to 30 parts by weight per total amount of 100 parts by weight of the copolymer (A) and the copper salt (B). When the content of the dewatering agent is about 1 to 50 parts by weight per the above-mentioned total amount of 100 parts by weight, the storage stability of the coating composition of the invention is further improved.

The antifouling coating composition of the present invention preferably further contains a dispersant (an antisettling agent). By containing a dispersant, sedimentation of the components (e.g., cuprous oxide mentioned above, pigments mentioned below) of the composition of the present invention, as well as the formation of a hard cake (a hard precipitate), can be prevented or inhibited during storage of the composition of the present invention. This also effectively solves the problem of dripping of the composition (the coating material) when a coating film is formed on the surface of an object to be coated by using the composition of the present invention.

Examples of dispersants include oxidized polyethylene-based dispersants, fatty acid amide-based dispersants, fatty acid ester-based dispersants, hydrogenated castor oil-based dispersants, vegetable polymerized oil-based dispersants, polyether ester-type surfactants, sulfate-type anionic surfactants, polycarboxylic acid amine salt-based dispersants, polycarboxylic acid-based dispersants, polymeric polyether-based dispersants, acrylic polymer-based dispersants, special silicon-based dispersants, talc-based dispersants, bentonite-based dispersants, kaolinite-based dispersants, silica gel-based dispersants, etc.

These dispersants may be used singly or in combination. The composition of the present invention preferably contains a fatty acid amide-based dispersant. The composition of the present invention can be produced by, for example, preparing a mixed solution containing the copolymer (A) etc., and then mixing and dispersing the mixed solution. When the mixed solution contains the fatty acid amide-based dispersant, the storage stability of the mixed solution can be enhanced, and the composition of the present invention can be obtained more easily and reliably.

In the present invention, commercially available dispersants may be used. Examples of the fatty acid amide-based dispersants include Dispalon A603-10X (or 20X), Dispalon A630-10X (or 20×), Dispalon 6900-10X (or 20X), and Dispalon 6810-10X (or 20X) (all products of Kusumoto Chemicals, Ltd.); Talen 7500-20 and Flownon SP-1000 (both products of Kyoeisha Chemical Co., Ltd.); etc. Among these, Dispalon A603-10X (or 20X) is preferred. Because these 1.0 dispersants do not include methanol, ethanol and like hydrophilic solvents, the storage stability of the antifouling coating composition can be more preferably maintained.

The dispersants may be used after being dispersed in a hydrophobic organic solvent, such as xylene.

There is no limitation to the content of the dispersant in the composition of the present invention; however, the content is preferably 1 to 50 parts by weight, and more preferably 2 to 30 parts by weight per total amount of 100 parts by weight of the copolymer (A) and the copper salt (B). When the content of the dispersant is about 1 to 50 parts by weight per the above-mentioned total amount of 100 parts by weight, the effects of the dispersant (i.e., preventing the formation of a hard cake) is preferably exhibited, and the storage stability of the coating composition of the invention is further improved.

It is preferable that the antifouling coating composition of the present invention may further contain known pigments. Examples of the usable pigments include zinc oxide, red iron oxide, talc, titanium oxide, silica, bentonite, dolomite, calcium carbonate, barium sulfate and like inorganic pigments, and organic pigments of red color, blue color, etc. These pigments may be used singly or in combination.

There is no limitation to the content of the pigment in the composition of the present invention; however, the content is preferably 1 to 50 parts by weight, and more preferably 10 to 20 parts by weight per total amount of 100 parts by weight of the copolymer (A) and the copper salt (B). When the content of the pigment is about 1 to 50 parts by weight per the above-mentioned total amount of 100 parts by weight, dissolution of the coating film and thus renewal of the coating film is promoted. In addition, there does not occur a problem that dissolution control in a sea area having a high seawater temperature becomes difficult due to enhancement of the penetration of seawater into the coating film.

In addition, the antifouling coating composition of the invention may, if necessary, include dyes, anti-flooding agent, antifoaming agents and like common additives for coating material.

The composition of the present invention is usually dissolved or dispersed in an organic solvent. This makes the coating material desirably usable. Examples of the usable organic solvents include xylene, toluene, mineral spirit, MIBK, butyl acetate, etc. Among these, xylene and MIBK are particularly preferable. These organic solvents may be used singly or in combination.

<Method of Production of Antifouling Coating Composition>

The antifouling coating composition of the invention can be manufactured, for example, by mixing the copolymer (A), the copper salt (B), and if necessary, known additives such as the cuprous oxide, the plasticizer, etc. in a solvent.

The amounts of the copolymer (A), the copper salt (B), etc. used may be suitably selected so that the resulting antifouling coating composition contains the copolymer (A), the copper salt (B), etc., in acceptable content ranges as described above.

Examples of the usable solvents include xylene, toluene, mineral spirit, MIBK, butyl acetate, etc. Among these, xylene is particularly preferable. They may be used singly or in combination.

These components may be mixed in such a manner that the copolymer (A) and like various materials are dissolved or dispersed in a solvent. For example, the copolymer (A) and the copper salt (B) may be dissolved or dispersed in a solvent first, and then mixed with other materials (such as organic antifoulants). As the solvent, the above-mentioned ones may be used.

Mixing may be conducted, for example, by a known disperser. The disperser may be desirably selected from those that can be used as micro-pulverizers. Specific Examples thereof include mills and dissolvers. Examples of the usable mills include ball mills, sand mills, bead mills, pearl mills, Dyno mills, Cowles mills, basket mills, attritors and like mills generally used for mixing and dispersing coating materials. A dissolver is a disperser having a rotary vane-type grinder. The mixed solution can be mixed and dispersed by rotating the grinder. The dissolver may also be called a disper.

When a cuprous oxide is contained, timing of adding the cuprous oxide and mixing conditions can be varied depending on the average particle diameter of the cuprous oxide.

Specifically, when a cuprous oxide having an average particle diameter of about 3 to 10 μm, preferably about 3 to 8 μm is used, it is preferable to mix the copolymer (A), the copper salt (B), the cuprous oxide, and if necessary, known additives, and after that, to mix and disperse the resultant mixture by the disperser mentioned above.

The cuprous oxide having an average particle diameter of about 3 to 10 μm tends to form secondary aggregation. Therefore, when ingredients containing a cuprous oxide are mixed, the obtained composition is likely to have aggregation. This may cause cracking or the like in the resulting coating film. By mixing and dispersing a mixed solution that contains cuprous oxide having an average particle diameter of about 3 to 10 μm using a disperser, the secondary-aggregated cuprous oxide can be broken down. This makes it possible to obtain an antifouling coating composition with the cuprous oxide desirably dispersed therein.

When a dissolver is used as the disperser, it is preferable that the grinder of the dissolver be rotated at high speed. By making the grinder rotate at a high speed, the secondary-aggregated cuprous oxide can be desirably broken down.

When a cuprous oxide having an average particle diameter of about 10 to 20 μm, preferably about 13 to 20 μm is used as the cuprous oxide, it is preferable to mix the copolymer (A), the copper salt (B), and if necessary, known additives, and after that, to add the cuprous oxide into the mixture.

When a cuprous oxide has an average particle diameter of about 10 to 20 μm, secondary aggregation is relatively unlikely to occur. For this reason, it is preferable to mix and disperse the copolymer (A) and the copper salt (B) using a disperser, to add the cuprous oxide to the resultant mixture, and to mix the mixture using a mixer so as not to pulverize the cuprous oxide particles as much as possible. According to this method, the cuprous oxide is hardly pulverized, and therefore, the surface area of the cuprous oxide in the resulting composition becomes relatively small. For example, the specific surface area of the cuprous oxide can be as small as about $1.3 \times 10^{-3}$ mm$^2$ or less, preferably, about $3.0 \times 10^{-1}$ to $1.3 \times 10^{-3}$ mm$^2$. When the surface area of the cuprous oxide is small, the coating film dissolving rate can be effectively controlled even in seawater having high temperature. In addition, according to the method, processing time for the process by the disperser above can be shortened, reducing the production cost of the composition of the present invention.

When a dissolver is used as a disperser, it is preferable that the rotation speed of the grinder be set to medium or low. By setting the rotation speed of the grinder to medium or low, crushing of the cuprous oxide can be effectively prevented.

<Method of Antifouling Treatment, Antifouling Coating Film, and Coated Object>

The method of antifouling treatment of the invention are characterized in that an antifouling coating film is formed on the surface of the object to be coated using the above-explained antifouling coating composition. The method of antifouling treatment of the present invention can prevent adhesion of aquatic fouling organisms by the gradual dissolution of the surface of the antifouling coating film, so as to continually renew the surface of the coating film. After the dissolution of the coating film, the antifouling effect can be continuously exhibited by recoating the composition.

Examples of objects on which a coating film can be formed include ships (in particular, ship bottoms), fishing tools, structures submerged in seawater, etc. Examples of the fishing tools include fishing nets for use in aquaculture or in fixed netting, and fishing net accessories such as floats attached to fishing nets, ropes, etc. Examples of structures submerged in seawater include power plant aqueducts, bridges, port facilities, etc. The method of antifouling treatment of the invention has small temperature dependency, and therefore this can be applied to antifouling treatment to a ship bottom of a ship which sails in various sea areas.

The antifouling coating film of the present invention can be formed by applying the antifouling coating composition to the surface (entirely or partially) of the object on which a coating film is formed.

Examples of the coating method include brush coating, spray coating, dipping, flow coating, spin coating, etc. These coating methods may be employed singly or in combination.

The coating composition is dried after application. The drying temperature may be room temperature. The drying time may be suitably selected depending on the thickness of the coating film, etc.

The thickness of the antifouling coating film may be suitably selected depending on the type of object on which a coating film is formed, the navigation speed of the ship, the seawater temperature, etc. For example, when the object on which a coating film is formed is a ship bottom, the thickness of the antifouling coating film is generally 50 to 500 μm, and preferably 100 to 400 μm.

The antifouling coating film of the present invention is advantageous in that:
1) It has excellent water resistance, and therefore cracking, peeling or the like is unlikely to occur even if it is in contact with seawater for a long time; 2) It has a suitable hardness, and therefore cold flow or other defects is unlikely to occur in the resulting coating film; 3) It has a high adhesiveness to the object on which a coating film is formed; and 4) It can effectively exhibit an antifouling effect in seawater for a long period of time, because it exhibits a stable coating film dissolving amount even in a sea area having a high seawater temperature (e.g., a sea area having a water temperature of 30 to 35 deg. C.).

The coated object of the present invention has the antifouling coating film on its surface. The coated object of the present invention may have the antifouling coating film on the entire surface thereof, or a part thereof.

The coated object of the present invention is covered with the antifouling coating film having the characteristics of Items 1 to 4 described above. Therefore, it can be desirably applied to ships (in particular, ship bottoms), fishing tools, structures submerged in seawater, etc.

For example, when the antifouling coating film is formed on the surface of a ship bottom, the antifouling coating film gradually dissolves from the surface, so that the coating film surface is always renewed. This prevents the adhesion of aquatic fouling organisms.

Furthermore, the hydrolysis rate of the antifouling coating film in seawater is desirably controlled. Therefore, ships benefit from the antifouling effect for a long period of time; additionally, even when the ships are not moving, for example, during anchorage, rigging, etc., the adhesion and incrustation of aquatic fouling organisms is barely observed, and the antifouling effect is exhibited for a long time.

The surface of the antifouling coating film is basically free from cracking or peeling even after a long period of time. Therefore, it is unnecessary to completely removing the existing coating film before re-forming a new coating film. Therefore, by directly recoating the antifouling coating film composition thereon, the antifouling coating film can be effectively formed. This makes it possible to continuously maintain the antifouling effect easily and at low cost.

EXAMPLE

Features of the invention will be further clarified referring to the Examples, etc. shown below; however, the invention is not limited by the Examples, etc.

In each of the production Examples, comparative production Examples, Examples, and comparative Examples, "%" denotes "% by weight". Viscosity was determined at 25 deg. C. using a Brookfield viscometer. The weight-average molecular weight (Mw) was determined by gel permeation chromatography (GPC) (using a polystyrene standard). GPC was performed under the following conditions.
Equipment: HLC-8220 GPC; Tosoh Corporation
Column: TSK-gel Super HZM-M. two
Flow rate: 0.35 mL/min
Detector: RI
Column thermostat temperature: 40 deg. C.
Eluate: THF The non-volatile content was determined by heating for 3 hours at 110 deg. C.

The amounts of each ingredient shown in Table 1 are represented in grams

Production Example 1

Production of Copolymer Solution (A); S-1

230 g of xylene was charged to a 1,000 ml flask equipped with a thermometer, a reflux condenser, a stirrer, and a dropping funnel, after which a mixture of 230 g of triisopropylsilyl methacrylate, 210 g of methoxyethyl methacrylate, 30 g of methyl methacrylate, 30 g of ethyl acrylate, and 4 g of t-butyl peroxy-2-ethyl hexanoate (initially added) was added dropwise into the flask over a period of 1 hour, while stirring at 100±2 deg. C. in a nitrogen atmosphere. After the dropwise addition, the polymerization reaction was performed for 2 hours at 100±2 deg. C. Then, while stirring the resulting reaction solution at 100±2 deg. C., 1 g of t-butyl peroxy-2-ethyl hexanoate (subsequently added) was added three times with 2-hour intervals to perform the polymerization reaction. After that, 270 g of xylene (additional solvent) was added and dissolved, thus producing the triorganosilyl ester-containing copolymer solution S-1. Table 1 shows the viscosity, non-volatile content, Mw, and Tg of S-1.

Production Examples 2 to 6 and Comparative Production Examples 1 to 4

Production of Copolymer Solutions S-2 to 6 and Comparative Copolymer Solutions H-1 to 4

Polymerization reactions were performed according to the same procedure as Production Example 1, using the organic solvent, monomers, and polymerization initiator shown in Table 1, thus producing the triorganosilyl ester-containing copolymer solutions S-2 to 6, and the comparative copolymer solutions H-1 to 4. Table 1 shows the viscosity, non-volatile content, Mw, and Tg of each copolymer solution obtained.

[Table 1]

Production Example 7

Production of Gum Rosin Copper Salt 400 g of a xylene solution of gum rosin (solid content: 50%); 200 g of cuprous oxide, and 100 g of methanol were added, together with glass beads (diameter: 2.5 to 3.5 mm), to a 1,000 ml flask equipped with a thermometer, a reflux condenser, and a stirrer, and the mixture was stirred for 8 hours at 70 to 80 deg. C. and then maintained for 2 days at 50 deg. C. The resulting mixture was cooled to room temperature (25 deg. C.) and filtered, and subsequently concentrated under reduced pressure to remove the methanol by distillation. Xylene was then added to the obtained concentrate, thus producing a xylene solution of gum rosin copper salt la transparent dark blue solution; solid content: about 50%). The resulting xylene solution of gum rosin copper salt had a non-volatile content of 50.8%.

Production Example 8

Production of Hydrogenated Rosin Copper Salt 400 g of a xylene solution of hydrogenated rosin (trade name "Highpale CH" produced by Arakawa Kagaku K. K.,

TABLE 1

| Ingredient Class | | Ingredient Name | Production Example | | | | | | Comparative Production Example | | | |
|---|---|---|---|---|---|---|---|---|---|---|---|---|
| | | | 1 | 2 | 3 | 4 | 5 | 6 | 1 | 2 | 3 | 4 |
| Solvent In Initial Container | | Xylene | 230 | 230 | 230 | 230 | 230 | 230 | 230 | 230 | 230 | 230 |
| Triorganosilyl Group-Containing Monomer | Methacrylate (Monomer (a)) | Triisopropylsilyl Methacrylate | 230 | 250 | 270 | 300 | | | 270 | | | |
| | | T-Butyldiphenylsilyl Methacrylate | | | | | 250 | 300 | | 270 | | |
| | Acrylate | Triisopropylsilyl Acrylate | | | | | | | | | 270 | |
| | | T-Butyldiphenylsilyl Acrylate | | | | | | | | | | 270 |
| Methoxyalkyl Methacrylate (Monomer (b)) | | 2-Methoxyethyl Methacrylate | 210 | 190 | 170 | 150 | 210 | 160 | 30 | 30 | 50 | |
| Ethylenically Unsaturated Monomer (c) | | Methyl Methacrylate | 30 | 30 | 30 | | 10 | 10 | 50 | 100 | 80 | 80 |
| | | N-Butyl Methacrylate | | | | 20 | | | | 50 | | |
| | | Ethyl Acrylate | 30 | | 30 | | 30 | 30 | | | | |
| | | N-Butyl Acrylate | | 30 | | 30 | | | 30 | 50 | | |
| | | 2-Methoxyethyl Acrylate | | | | | | | 120 | | 100 | 150 |
| Total Amount (Weight %) Of Monomer (a) And Monomer (b) Per The Total Monomers | | | 88 | 88 | 88 | 90 | 92 | 92 | 60 | 60 | 10 | 0 |
| Total Monomers (g) | | | 500 | 500 | 500 | 500 | 500 | 500 | 500 | 500 | 500 | 500 |
| Polymerization Initiator | Initially Added | T-Butyl Peroxy 2-Ethyl Hexanoate | 4 | 4 | 4 | 4 | 4 | 4 | 4 | 4 | 4 | 4 |
| | Subsequently Added 3 Times | T-Butyl Peroxy 2-Ethyl Hexanoate | 1 x 3 times | 1 x 3 times | 1 x 3 times | 1 x 3 times | 1 x 3 times | 1 x 3 times | 1 x 3 times | 1 x 3 times | 1 x 3 times | 1 x 3 times |
| Solvent Added After Completion Of Polymerization Reaction | | Xylene | 270 | 270 | 270 | 270 | 270 | 270 | 270 | 270 | 270 | 270 |
| Reaction Temperature (Deg. C.) | | | 100 ± 2 | 100 ± 2 | 100 ± 2 | 100 ± 2 | 100 ± 2 | 100 ± 2 | 100 ± 2 | 100 ± 2 | 100 ± 2 | 100 ± 2 |
| Copolymer | | Viscosity (mPa · S/25 Deg. C.) | 380 | 350 | 340 | 295 | 330 | 310 | 220 | 690 | 140 | 180 |
| | | Non-Volatile Content (%, 110 Deg. C. 3 Hrs) | 50.1 | 49.8 | 49.8 | 49.7 | 49.8 | 49.6 | 49.8 | 49.7 | 50.0 | 49.9 |
| | | Weight-Average Molecular Weight (Mw) | 48,000 | 47,000 | 45,000 | 43,000 | 47,000 | 42,000 | 45,000 | 45,000 | 48,000 | 47,000 |
| | | Glass Transition Temperature (Tg, Deg. C.) | 43 | 42 | 48 | 44 | 50 | 58 | 25 | 61 | 19 | 15 |
| | | Copolymer Name | S-1 | S-2 | S-3 | S-4 | S-5 | S-6 | H-1 | H-2 | H-3 | H-4 | acid number 163 mgKOH/g)(solid content: 50%), 200 g of cuprous oxide, 100 g of methanol, and glass beads (diameter: 2.5 to 3.5 mm) were added to a 1,000 ml flask equipped with a thermometer, a reflux condenser, and a stirrer, and the mixture was stirred for 8 hours at 70 to 80 deg. C. and then maintained for 2 days at 50 deg. C. The resulting mixture was cooled to room temperature (25 deg. C.) and filtered, and subsequently concentrated under reduced pressure to remove the methanol by distillation. Xylene was then added to the obtained concentrate, thus producing a xylene solution of hydrogenated rosin copper salt (a transparent dark blue solution; solid content: about 50%). The resulting xylene solution of hydrogenated rosin copper salt had a non-volatile content of 50.3%.

Production Example 9

Production of Disproportionated Rosin Copper Salt 400 g of a xylene solution of disproportionated rosin (trade name "Rondis R" produced by Arakawa Kagaku K. K., acid number 157 mgKOH/g)(solid content: 50%), 200 g of cuprous oxide, 100 g of methanol, and glass beads (diameter: 2.5 to 3.5 mm) were added to a 1,000 ml flask equipped with a thermometer, a reflux condenser, and a stirrer, and the mixture was stirred for 8 hours at 70 to 80 deg. C. and then maintained for 2 days at 50 deg. C. The resulting mixture was cooled to room temperature (25 deg. C.) and filtered, and subsequently concentrated under reduced pressure to remove the methanol by distillation. Xylene was then added to the obtained concentrate, thus producing a xylene solution of disproportionated rosin copper salt (a transparent dark blue solution; solid content: about 50%). The resulting xylene solution of disproportionated rosin copper salt had a non-volatile content of 50.2%.

Example 1, 4, 7, 8, and Comparative Examples 1 to 4

Production of Coating Compositions

Copolymer Solutions S-1, S-2, and S-4 obtained in Production Examples 1 to 6 and Copolymer Solutions H-1 to H-4 obtained in Comparative Production Examples 1 to 4 for use as copolymers; the xylene solutions of gum rosin copper salts or hydrogenated rosin copper salts or disproportionated rosin copper salts (solid content: about 50%) obtained in Production Examples 7 to 9 for use as rosin copper salts; and cuprous oxide with an average particle diameter of 3 or 6 μm for use as cuprous oxide; as well as the organic antifoulants, pigments, additives, and solvents listed in Table 2 were blended in the proportions (parts by weight) shown in Table 2. The above ingredients were mixed and dispersed together with glass beads with a diameter of 1.5 to 2.5 mm to produce coating compositions.

Example 2, 3, 5, 6

Production of Coating Compositions

Copolymer Solutions S-2, S-3, S-5, S-6 obtained in Production Examples 2, 3, 5, 6 for use as copolymers; the xylene solutions of hydrogenated rosin copper salts (solid content: about 50%) obtained in Production Examples 8 or disproportionated rosin copper salts (solid content: about 50%) obtained in Production Examples 9 for use as rosins; as well as the antifoulants, pigments, additives, and solvents listed in Table 2 were blended in the proportions (parts by weight) shown in Table 2. The above ingredients were mixed and dispersed together with glass beads with a diameter of 1.5 to 2.5 mm. Cuprous oxide with an average particle diameter of 13 or 19 μm was subsequently added to the mixtures and slowly stirred with a stirring blade, thus producing coating compositions.

[Table 2]

TABLE 2

| Ingredient Name | Example | | | | | | | | Comparative Example | | | |
|---|---|---|---|---|---|---|---|---|---|---|---|---|
| | 1 | 2 | 3 | 4 | 5 | 6 | 7 | 8 | 1 | 2 | 3 | 4 |
| Copolymer | | | | | | | | | | | | |
| S-1 | 15 | | | | | | 12.5 | | | | | |
| S-2 | | 15 | | | | | | 15 | | | | |
| S-3 | | | 15 | | | | | | | | | |
| S-4 | | | | 10 | | | | | | | | |
| S-5 | | | | | 12.5 | | | | | | | |
| S-6 | | | | | | 12.5 | | | | | | |
| H-1 | | | | | | | | | 15 | | | |
| H-2 | | | | | | | | | | 12.5 | | |
| H-3 | | | | | | | | | | | 15 | |
| H-4 | | | | | | | | | | | | 10 |
| Rosin | | | | | | | | | | | | |
| Gum Rosin Copper Salt Solution (Solid Content: About 50%, Xylene Solution | 10 | | 15 | | | | 10 | 10 | 12.5 | | | |
| Hydrogenated Rosin Copper Salt Solution (Solid Content: About 50%, Xylene Solution | | 10 | | | 12.5 | | | | | | | |
| Disproportionated Rosin Copper Salt Solution (Solid Content About 50%, Xylene Solution) | | | | 10 | | 12.5 | | | | | | |
| Gum Rosin Zinc Salt Solution (Solid Content: About 50%, Xylene Solution) | | | | | | | 2.5 | 5 | 10 | | 15 | 5 |
| Gum Rosin Solution (Solid Content: About 50%, Xylene Solution) | | | | | | | | | | | | 10 |
| Plasticizer | | | | | | | | | | | | |
| Sansocizer E-2000H (New Japan Chemical Co., Ltd., Epoxidized Soybean Oil) | 1 | 1 | 1 | 1 | 1 | 1 | 1 | 1 | | | | |
| Tricrasyl Phosphate (Kishida Chemical Co., ltd., Special Grade) | 1 | | | | | | 1 | 1 | | 1 | | 1 |
| Lutonal A25 (BASF, Ethylvinylether Copolymer) | | | | | | | | | | 1 | | 1 |

TABLE 2-continued

| Ingredient Name | Example | | | | | | | | Comparative Example | | | |
|---|---|---|---|---|---|---|---|---|---|---|---|---|
| | 1 | 2 | 3 | 4 | 5 | 6 | 7 | 8 | 1 | 2 | 3 | 4 |
| Cuprous Oxide | | | | | | | | | | | | |
| NC-301 (Nissin Chemco, Ltd., Average Particle Diameter 3 µm) | 45 | | | | | | 45 | 40 | 45 | 45 | 40 | 45 |
| Red Copp 97N (American Chemet Corporation, Average Particle Diameter 6 µm) | | | | 45 | | | | | | | | |
| Purple Copp (American Chemet Corporation, Average Particle Diameter 13 µm) | | 45 | | | 45 | | | | | | | |
| Lolo Tint 97N (American Chemet Corporation, Average Particle Diameter 19 µm) | | | 45 | | | 45 | | | | | | |
| Antifoulant | | | | | | | | | | | | |
| Copper Pyrithione (Arch Chemicals, Inc, Copper Omadine) | 3 | 3 | 3 | | 3 | 3 | 3 | 3 | | 3 | 3 | |
| Sea-Nine 211 (Effective Component 30%, Xylene Solution, Rohm And Haas Company) | | | | 10 | | | | | 10 | | | |
| Irgarol 1051 (Ciba Inc.) | | | | | | | | | | | | 3 |
| Pigment | | | | | | | | | | | | |
| Red Iron Oxide (Toda Pigment Corp., Toda Color EP-13D) | 5 | 5 | 5 | 5 | 5 | 5 | 5 | 5 | 5 | 5 | 5 | 5 |
| Talc (Matsumura Industries Co., Ltd., Crown Talc 3S) | 3 | 3 | 3 | 3 | 3 | 3 | 3 | 3 | 3 | 3 | 3 | 3 |
| Zinc Oxide (Seido Chemical Industry Co., Ltd., Zinc Oxide Second (Trade Name)) | 2 | 2 | 2 | 2 | 2 | 2 | 2 | 2 | 2 | 2 | 2 | 2 |
| Titanium Oxide (Furukawa Co., Ltd., FR-41) | 1 | 1 | 1 | 1 | 1 | 1 | 1 | 1 | 1 | 1 | 1 | 1 |
| Other Additives | | | | | | | | | | | | |
| Tatraethoxysilane (Kishida Chemical Co., Ltd., Special Grade) | 1 | 1 | 1 | 1 | 1 | 1 | | | | | | |
| Molecular Sieves 4A (Union Showa K.K., Synthetic Zeolite Powder) | | | | | | | 1 | 1 | 1 | 1 | 1 | 1 |
| Dispalona 603-20x (Kusumoto Chemicals, Ltd., Fatty Acid Amide-based Thixotropic Agent, Effective Component 20%, Xylene Paste) | 3 | 3 | 3 | 3 | 3 | 3 | 3 | 3 | 3 | 3 | 3 | 3 |
| Solvent | | | | | | | | | | | | |
| Xylene | 10 | 11 | 11 | 4 | 11 | 11 | 10 | 10 | 4 | 11 | 11 | 11 |
| Total | 100 | 100 | 100 | 100 | 100 | 100 | 100 | 100 | 100 | 100 | 100 | 100 |

Test Example 1

Stability Test for Coating Compositions

Each of the coating compositions obtained in Examples 1 to 8 and Comparative Examples 1 to 4 was sealed in a 100 ml wide-mouth tin can and stored in an incubator at 40 deg. C. for 1 month, after which the viscosity of the coating composition was measured using a Brookfield viscometer.

The viscosity of the coating composition was evaluated as follows.
A: a change in viscosity of less than 500 mPa·s/25 deg. C. (substantially no change in the coating composition)
B: a change in viscosity of 500 to 5,000 mPa·s/25 deg. C. (a slight increase in viscosity)
C: a change in viscosity of more than 5,000 and up to 100,000 mPa·s/25 deg. C. (a significant increase in viscosity)
D: a change so significant that the viscosity was unmeasurable (the coating composition turned into a gel or solidified)
The results are shown in Table 3.

It can be seen from Table 3 that the coating material formed using the coating composition of the invention (Examples 1 to 8) is excellent in storage stability.

Test Example 2

Coating Film Hardness

Each of the antifouling coating compositions obtained in Examples 1 to 8 and Comparative Examples 1 to 4 was applied to a transparent glass plate (75×150×1 mm) so that the dry coating film thickness would be about 100 µm, and dried for 1 day at 40 deg. C. The coating film hardness of the resulting dry coating film was measured at 25 deg. C. using a pendulum hardness tester. The results (count number) are shown in Table 3. A count number of 20 to 50 is preferable for practical purposes.

It can be seen from Table 3 that the coating films formed using the coating compositions of the invention (Ex. 1-8) have a suitable hardness.

Test Example 3

Adhesion Test for Coating Films

The adhesion of each coating film was tested in accordance with JIS K-5600-5-6. Specifically, tests were conducted according to the following method. Each of the coating compositions obtained in Examples 1 to 8 and Comparative Examples 1 to 4 was first applied to a tin plate (75×150×2 mm) so that the dry coating film thickness would be about 100 µm. The applied coating was then dried for 1 day at 40 deg. C. to prepare a dry coating film with a thickness of about 100 µm. After that, the adhesion test was conducted.

The evaluation was conducted in the following way.
(1) Evaluation Before Tape Treatment Horizontal eleven lines are vertical eleven lines are formed on the dried coating film with a cutter so as to reach the base (the tin plate) and to form a crosshatch having 100 squares (each 2×2 mm). The adhesion state of the coating film in the crosshatch was visually inspected.
A: the number of the squares that did not peel off is from 70 to 100.
B: the number of the squares that did not peel off is from 40 to 69.
C: the number of the squares that did not peel off is from 20 to 39.
D: the number of the squares that did not peel off is from 0 to 19.

(2) Evaluation after Tape Treatment

After the evaluation of the above (1), a cellophane tape (NICHIBAN CO., LTD. tape width 24 mm) was affixed to the above-mentioned 100 squares, and one end of the tape was held, and the tape was peeled-off quickly. After that, the adhesion state of the coating film was visually inspected.
A: the number of the squares that did not peel off is from 70 to 100.
B: the number of the squares that did not peel off is from 40 to 69.
C: the number of the squares that did not peel off is from 20 to 39.
D: the number of the squares that did not peel off is from 0 to 19.

The results are shown in Table 3.

It can be seen from Table 3 that the coating films formed using the coating compositions of the invention (Ex. 1-8) strongly adhere to the tin plate.

Test Example 4

Flexibility Test for Coating Films

Each of the coating compositions obtained in Examples 1 to 8 and Comparative Examples 1 to 4 was applied to a blast-finished tin plate (75×150×2 mm) so that the dry coating film thickness would be about 100 μm. The applied coating was then dried for 1 day at 40 deg. C. to prepare a dry coating film with a thickness of about 100 μm. The tin plate coated with the dry coating film was bent 90 deg., and the condition of the bent coating film was visually inspected.

The flexibility was evaluated as follows.
A: substantially free of cracks
B: contained minute cracks
C: contained large cracks
D: a portion of the coating film was easily peeled-off
The results are shown in Table 3.

It can be seen from Table 3 that the coating films formed using the coating compositions of the invention (Ex. 1 to 8) are excellent in flex resistance.

Test Example 5

Water Resistance Test for Coating Films

An anti-corrosive coating film was formed by applying an anti-corrosive coating material (a vinyl-based A/C) to a ground glass plate (75×150×1 mm) so that the thickness after drying would be about 50 μm, followed by drying. Each of the coating compositions obtained in Examples 1 to 8 and Comparative Examples 1 to 4 was subsequently applied to the anti-corrosive coating film so that the dry coating film thickness would be about 100 μm. The applied coating was dried for 1 day at 40 deg. C., thus preparing a test piece with a dry coating film thickness of about 100 μm. The test piece was immersed in natural seawater at 35 deg. C. for 3 months, after which the condition of the coating film was visually inspected.

The water resistance was evaluated as follows.
A: the coating film underwent no change
B: the coating film slightly changed color
C: the coating film was slightly blistered
D: defects such as cracks, swelling, and peeling were observed in the coating film The results are shown in Table 3.

It can be seen from Table 3 that the coating films formed using the coating film compositions of the invention (Ex. 1-8) have excellent resistance to water.

[Table 3]

TABLE 3

|  |  | Coating Material Stability | Coating Film Hardness | Adhesion Test | | Flexibility Test | Water Resistance Test |
|---|---|---|---|---|---|---|---|
|  |  | 40 Deg. C. After 1 Month | Count Number (Pendulum) | Before Tape Treatment | After Tape Treatment |  | 35 deg. C. After 3 months |
| Ex. | 1 | A | 35 | A | B | B | B |
|  | 2 | A | 32 | A | A | A | A |
|  | 3 | A | 28 | A | A | A | A |
|  | 4 | A | 26 | A | B | B | B |
|  | 5 | A | 37 | A | A | A | A |
|  | 6 | A | 34 | A | A | A | A |
|  | 7 | A | 35 | A | B | B | B |
|  | 8 | A | 32 | A | B | B | B |
| Comp. Ex. | 1 | C | 22 | B | C | C | C |
|  | 2 | A | 45 | C | C | C | A |
|  | 3 | C | 33 | B | C | C | C |
|  | 4 | D | 36 | A | A | A | D |

Test Example 6

Solubility Test (Rotary Test) for Coating Films

A tank was provided, in the center thereof, with a rotating drum with a diameter of 515 mm and a height of 440 mm to allow the rotation of the drum via a motor. The tank was also provided with a cooling apparatus for keeping the seawater temperature constant, and a pH automatic controller for keeping the pH of the seawater constant.

Two test plates were prepared for each coating composition according to the following method.

An anti-corrosive coating film was formed by applying an anti-corrosive coating material (a vinyl-based A/C) to a hard vinyl chloride plate (75×150×1 mm) so that the thickness after drying would be about 50 μm, followed by drying. Each of the antifouling coating compositions obtained in Examples 1 to 8 and Comparative Examples 1 to 4 was applied to the anti-corrosive coating film so that the thickness after drying would be about 300 μm. The applied coating was dried for 3 days at 40 deg. C., thus preparing a test plate having a dry coating film with a thickness of about 300 μm.

One of the thus-prepared test plates was secured to the rotating drum of the rotary apparatus of the above-mentioned equipment to contact the seawater, and the rotating drum was rotated at a speed of 20 knots. During the test, the seawater temperature was maintained at 25 deg. C. and the pH at 8.0 to 8.2; the seawater was replaced once every week.

The initial coating film thickness and the remaining coating film thickness after every 3 months from the beginning of the test were measured for each test plate, using a laser focus displacement meter, and the thickness of the dissolved coating film was calculated from the difference therebetween to give the dissolving amount of the coating film per month (μm/month). The measurement was conducted for 24 months, and the coating film dissolving amount was calculated every 12 months.

The results are shown in Table 4.

It can be seen from Table 4 that the coating films formed using the coating compositions of the invention (Ex. 1 to 8) are dissolved in seawater in amounts of about 2 to 5 μm per month (annual average). Specifically, this shows that the coating films formed using the coating compositions of the invention exhibit certain reductions in the dissolving rate, so that they are dissolved stably for an extended period of time.

In contrast, the coating films formed using the coating composition of Comparative Examples 1 and 3 have a large dissolving rate in seawater, and the dissolving amount is not stable.

Furthermore, the coating films formed using the coating composition of Comparative Example 2 has a small dissolving rate in seawater, and therefore cannot sufficiently exhibit an antifouling effect.

Furthermore, the coating films formed using the coating composition of Comparative Example 4 was largely penetrated by water in seawater, and as a result, crack or peel-off occurred, and thus measurement of the dissolving amount was not possible.

[Table 4]

TABLE 4

Coating Film Dissolving Amount and State In Rotary Test

| | Average Coating Film Dissolving Amount From Beginning to 12 Months (μm/Month) | Average Coating Film Dissolving Amount From 12 Months to 24 Months (μm/Month) |
|---|---|---|
| Ex. | | |
| 1 | 4.1 | 3.7 |
| 2 | 3.6 | 3.5 |
| 3 | 3.3 | 3.6 |
| 4 | 3.5 | 4.1 |
| 5 | 3.0 | 3.1 |
| 6 | 2.8 | 3.3 |
| 7 | 3.9 | 4.0 |
| 8 | 4.5 | 4.6 |

TABLE 4-continued

Coating Film Dissolving Amount and State In Rotary Test

| | Average Coating Film Dissolving Amount From Beginning to 12 Months (μm/Month) | Average Coating Film Dissolving Amount From 12 Months to 24 Months (μm/Month) |
|---|---|---|
| Comp. Ex. | | |
| 1 | 7.5 | 8.7 |
| 2 | 1.8 | 1.2 |
| 3 | 8.2 | 9.2 |
| 4 | Crack, Peel-off | — |

Test Example 7

Temperature Dependency Coefficient of Coating Film Dissolving Amount

Each of the coating compositions obtained in Examples 1 to 8 and Comparative Examples 1 to 4 was applied to the outer surface of a circular cylinder (made of polycarbonate) with a diameter of 75 mm and a height of 150 mm so that the dry coating film thickness would be about 200 μm. The applied coating was then vacuum-dried for 24 hours at 40 deg. C. to prepare a test circular cylinder. The weight was measured.

The obtained test circular cylinder was vertically attached to Three-One Motor, and rotatably set to a water tank. Thereafter, artificial seawater (Aquamarine produced by Yashima Pure Chemicals Co., Ltd.) was supplied into the water tank so as to immerse the entire test circular cylinder, to prepare two sets of test apparatuses. Water temperature was kept at 25 deg. C. for one test apparatus, and was kept at 35 deg. C. for the other test apparatus. During the test, the test circular cylinder was rotated at a speed of 200 rpm, and the artificial seawater was replaced every other week.

After 12 months, the test circular cylinder was taken out, and vacuum-dried for 24 hours at 40 deg. C. After that, the weight of the test circular cylinder was measured. The coating film dissolving amounts at 35 deg. C. and at 25 deg. C. were calculated according to the reduction in weight during the 12 months. The temperature dependency coefficient of each of the antifouling coating films was calculated according to the following formula.

Temperature Dependency Coefficient=(Coating Film Dissolving Amount (Weight) In Seawater At 35 Deg. C.)/(Coating Film Dissolving Amount (Weight) In Seawater At 25 Deg. C.)

The results are shown in Table 5.

It can be seen from Table 5 that the coating films formed using the coating compositions of the invention (Ex. 1 to 8) have a temperature dependency coefficient of 1.3 or less, and thus the dissolving amount is virtually temperature-independent.

In contrast, it can be seen that the coating films formed using the coating composition of Comparative Examples 1 and 3 have a temperature dependency coefficient of more than 1.5, and thu the dissolving amount is temperature-dependent.

Furthermore, the coating films formed using the coating composition of Comparative Example 2 has a small dissolving amount in seawater, and therefore cannot sufficiently exhibit an antifouling effect.

Furthermore, the coating films formed using the coating composition of Comparative Example 4 was largely penetrated by water in seawater, and as a result, crack or peel-off occurred, and thus measurement of the dissolving amount was not possible.

[Table 5]

TABLE 5

| | Coating Film Dissolving Amount | | |
|---|---|---|---|
| | Dissolving Amount After 12 Months at 25 Deg. C. (mg/cm2) | Dissolving Amount After 12 Months at 35 Deg. C. (mg/cm2) | Temperature Dependency Coefficient |
| Ex. | | | |
| 1 | 5.65 | 6.84 | 1.21 |
| 2 | 5.52 | 6.63 | 1.20 |
| 3 | 5.73 | 7.06 | 1.23 |
| 4 | 5.82 | 7.33 | 1.26 |
| 5 | 4.71 | 5.62 | 1.19 |
| 6 | 4.46 | 5.21 | 1.17 |
| 7 | 5.90 | 7.27 | 1.23 |
| 8 | 6.11 | 7.70 | 1.26 |
| Comp. Ex. | | | |
| 1 | 7.63 | 11.83 | 1.55 |
| 2 | 2.32 | 2.57 | 1.11 |
| 3 | 8.46 | 13.91 | 1.64 |
| 4 | Crack, Peel-off | Crack, Peel-off | Not Mesureable |

Test Example 8

Antifouling Test

Each of the coating compositions obtained in Examples 1 to 8 and

Comparative Examples 1 to 4 was applied to both surfaces of a hard vinyl chloride plate (100×200×2 mm) so that the dry coating film thickness would be about 200 μm. The applied coating was dried for 3 days at room temperature (25 deg. C.), thus preparing a test plate having a dry coating film with a thickness of about 200 μm. This test plate was immersed at 1.5 m below sea level in Owase City, Mie Prefecture, Japan, and fouling of the test plate was examined for 24 months.

The results are shown in Table 6.

Note that the figures in Table 6 represent the areas (%) to which fouling organisms were attached.

It can be seen from Table 6 that the coating films formed using the coating compositions of the invention (Ex. 1-8) are substantially free of aquatic fouling organisms. This is because the coating films formed using the coating compositions of the invention exhibit certain reductions in the hydrolysis rate, so that they are dissolved stably for an extended period of time.

[Table 6]

TABLE 6

| | | Test Period | | | | | |
|---|---|---|---|---|---|---|---|
| | | After 6 Months | After 12 Months | After 18 Months | After 24 Months | Attached Objects | Remarks |
| Ex. | 1 | 0 | 0 | 0 | 0 | | |
| | 2 | 0 | 0 | 0 | 0 | | |
| | 3 | 0 | 0 | 0 | 0 | | |
| | 4 | 0 | 0 | 0 | 0 | | |
| | 5 | 0 | 0 | 0 | 0 | | |
| | 6 | 0 | 0 | 0 | 0 | | |

TABLE 6-continued

| | | Test Period | | | | | |
|---|---|---|---|---|---|---|---|
| | | After 6 Months | After 12 Months | After 18 Months | After 24 Months | Attached Objects | Remarks |
| | 7 | 0 | 0 | 0 | 0 | | |
| | 8 | 0 | 0 | 0 | 0 | | |
| Comp. Ex. | 1 | 0 | 0 | 0 | 0 | | |
| | 2 | 0 | 10 | 40 | 70 | Serpula, Barnacle | |
| | 3 | 0 | 0 | 0 | 0 | | |
| | 4 | 0 | 0 | 10 | 20 | Serpula | Patial Peel-Off After 18 Months |

The invention claimed is:

1. An antifouling coating composition comprising:
   (A) a triorganosilyl ester-containing copolymer obtained by a mixture of
      (a) a triorganosilyl methacrylate monomer represented by a general formula (1):

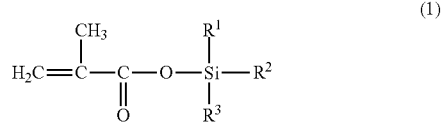

in which,
   $R^1$, $R^2$, and $R^3$ are equal or different each other, and each represent an alkyl group having 3 to 6 carbons and branched on α-position or a phenyl group, and
      (b) a methoxyalkyl methacrylate monomer represented by a general formula (2):

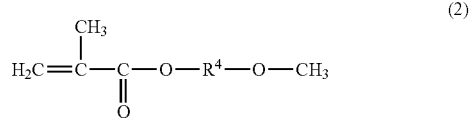

in which,
   R4 represents an alkylene group having 2 to 4 carbons, wherein a content ratio of the monomer (a) in the mixture is 45 to 65 weight %, and a total content of the monomer (a) and the monomer (b) in the mixture is 80 weight or more, and
   (B) a copper salt that is at least one member selected from the group consisting of rosin copper salts and copper salts of rosin derivatives.

2. The antifouling coating composition of claim 1, wherein the antifouling coating composition forms an antifouling coating film which has a coating film dissolving amount in seawater of 25 deg. C. which is 2 μm or more per month, and has a temperature dependency coefficient of a coating film dissolving amount (a coating film dissolving amount in seawater of 35 deg. C./a coating film dissolving amount in seawater of 25 deg. C.), coefficient being 3 or less.

3. The antifouling coating composition of claim 1, wherein the triorganosilyl ester-containing copolymer (A) has a weight-average molecular weight of 20,000 to 70,000.

4. The antifouling coating composition of claim 1, wherein a weight ratio defined by the triorganosilyl ester-containing copolymer (A)/the copper salt (B) is 80/20 to 20/80.

5. The antifouling coating composition of claim 1, wherein a weight ratio defined by the triorganosilyl ester-containing copolymer (A)/the copper salt (B) is 60/40 to 40/60.

6. A method of antifouling treatment comprising the step of forming an antifouling coating film on the surface of an object to be coated using the antifouling coating composition of claim 1.

7. An antifouling coating film formed by using the antifouling coating composition of claim 1.

8. A coated object having the antifouling coating film of claim 7 on the surface thereof.

* * * * *